United States Patent
Liu et al.

(10) Patent No.: US 10,019,624 B2
(45) Date of Patent: Jul. 10, 2018

(54) FACE RECOGNITION SYSTEM AND FACE RECOGNITION METHOD

(71) Applicant: HON HAI PRECISION INDUSTRY CO., LTD., New Taipei (TW)

(72) Inventors: Tien-Ping Liu, New Taipei (TW); Yu-Tai Hung, New Taipei (TW); Fu-Hsiung Yang, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 84 days.

(21) Appl. No.: 15/168,879

(22) Filed: May 31, 2016

(65) Prior Publication Data

US 2017/0228585 A1   Aug. 10, 2017

(30) Foreign Application Priority Data

Jan. 22, 2016  (TW) .............................. 105101984 A

(51) Int. Cl.
  *G06K 9/00*   (2006.01)
(52) U.S. Cl.
  CPC ..... *G06K 9/00288* (2013.01); *G06K 9/00228* (2013.01)
(58) Field of Classification Search
  None
  See application file for complete search history.

(56) References Cited

U.S. PATENT DOCUMENTS

| 8,966,613 | B2* | 2/2015 | Horvitz | G06F 21/32 726/17 |
| 8,983,207 | B1* | 3/2015 | Ran | G06K 9/00255 382/181 |
| 2007/0022304 | A1* | 1/2007 | Yanagawa | G06F 21/35 713/186 |
| 2009/0215533 | A1* | 8/2009 | Zalewski | A63F 13/00 463/32 |
| 2010/0169576 | A1* | 7/2010 | Chen | G06F 12/0897 711/122 |
| 2011/0170780 | A1* | 7/2011 | Vaddadi | G06K 9/4671 382/190 |
| 2011/0242279 | A1* | 10/2011 | Redert | H04N 13/0059 348/43 |
| 2013/0051632 | A1* | 2/2013 | Tsai | G06K 9/00892 382/118 |
| 2013/0101206 | A1* | 4/2013 | Dedeoglu | G06T 7/0081 382/154 |
| 2013/0272548 | A1* | 10/2013 | Visser | G06K 9/00624 381/122 |

(Continued)

*Primary Examiner* — Jayesh A Patel
(74) *Attorney, Agent, or Firm* — ScienBiziP, P.C.

(57) ABSTRACT

The disclosure relates to a face recognition system. The face recognition system includes a camera module configured to acquire face recognition information of a target object; a feature point recognition module configured to select facial feature points; a displacement output module configured to output a displacement and azimuth of the camera module during acquiring the face recognition information at different positions; a distance calculation module configured to calculate depth distances between the facial feature points and the displacement between the different positions; and a face recognition module configured to judge whether the target object is the target user. A face recognition method is also related.

9 Claims, 4 Drawing Sheets

(56) References Cited

U.S. PATENT DOCUMENTS

2014/0147023 A1* 5/2014 Lee .................... G06K 9/00288
   382/118
2014/0185939 A1* 7/2014 Kim ..................... G06T 3/0006
   382/201

* cited by examiner

FACE RECOGNITION SYSTEM AND FACE RECOGNITION METHOD

CROSS-REFERENCE TO RELATED APPLICATIONS

This application claims all benefits accruing under 35 U.S.C. § 119 from Taiwan Patent Application No. 105101984, filed on Jan. 22, 2016, in the Taiwan Intellectual Property Office, the contents of which are hereby incorporated by reference.

FIELD

The subject matter herein generally relates to face recognition systems and face recognition methods, particularly, to face recognition systems and face recognition methods based on single lens image data.

BACKGROUND

Face recognition is a biometric technology which is based on the identification of human face feature information. Face images or video can be captured by the video camera and automatically detected and tracked by face recognition.

With the technology development, face recognition has been applied in many fields, for example, face recognition attendance system, face recognition anti-theft door, face recognition to unlock the phone, face recognition to run with the robot. In recent years, in the process of the development of face recognition technology, the face fraud are used. For example, the face image is placed in face recognition system by printing face image to the paper or using the display screen. The face image is much similar with the face and hard to be recognized. Multi lens or RGBD system has been used to recognize true and false face in the face recognition technology. However, multi lens or RGBD system are expensive and cannot be used in the small electric device such as mobile phone.

What is needed, therefore, is to provide a face recognition system and a face recognition method which can overcome the shortcomings as described above.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

Figure 1:
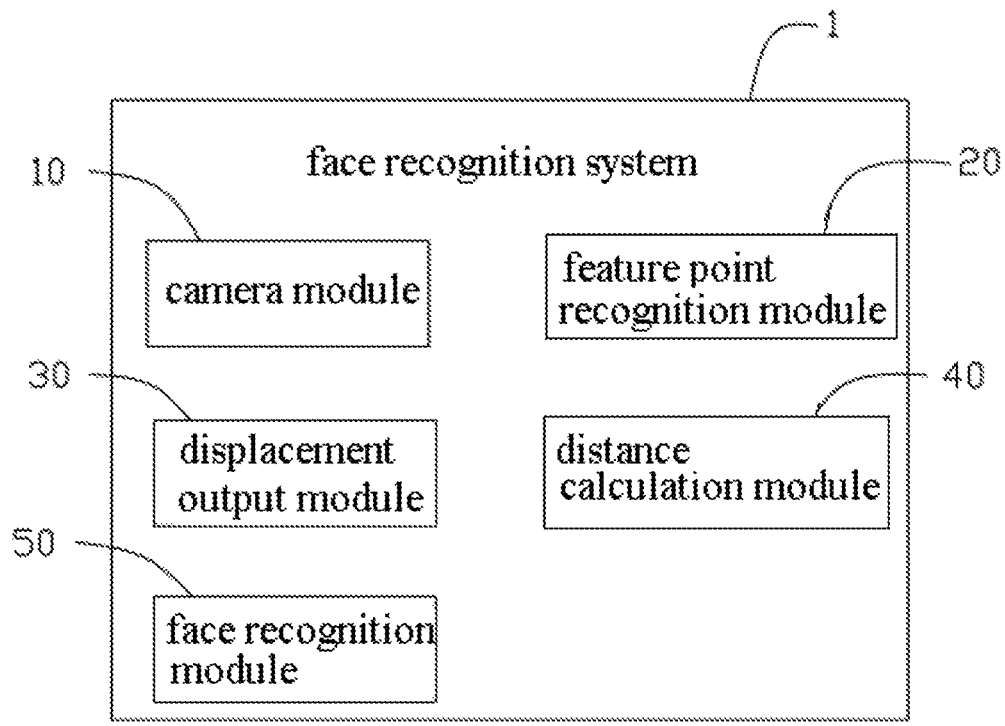
FIG. 1 is a functional diagram of one embodiment of a face recognition system.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

Several definitions that apply throughout this disclosure will now be presented.

The connection can be such that the objects are permanently connected or releasably connected. The term "substantially" is defined to be essentially conforming to the particular dimension, shape or other word that substantially modifies, such that the component need not be exact. The term "comprising" means "including, but not necessarily limited to"; it specifically indicates open-ended inclusion or membership in a so-described combination, group, series and the like. It should be noted that references to "an" or "one" embodiment in this disclosure are not necessarily to the same embodiment, and such references mean at least one.

The present disclosure relates to face recognition systems and face recognition methods described in detail as below.

Referring to FIG. 1, a face recognition system 1 of this disclosure is provided. The face recognition system 1 includes a camera module 10, a feature point recognition module 20, a displacement output module 30, a distance calculation module 40 and a face recognition module 50. The camera module 10 is configured to acquire face recognition information of a target object and send the face recognition information to a database. The feature point recognition module 20 is configured to detect face image and select facial feature points. The displacement output module 30 is configured to output displacement and azimuth of the camera module 10 during acquiring the face recognition information at different positions. The distance calculation module 40 is configured to calculate depth distances between the facial feature points obtained by the feature point recognition module 20 and the different positions of the camera module 10 during acquiring the face recognition information. The face recognition module 50 is configured to judge whether the target object is the target user by comparing the depth distances of the facial feature points of the target object.

Figure 2:
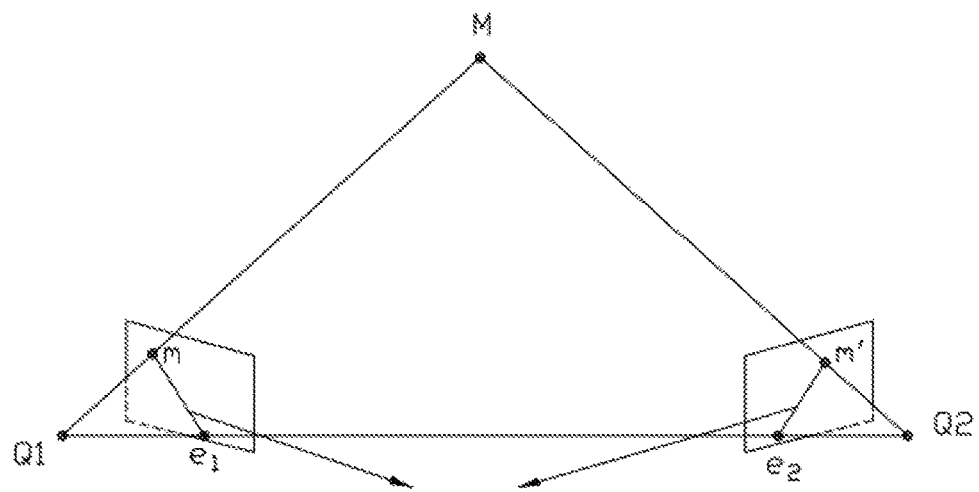
FIG. 2 is an application diagram of one embodiment of scale invariant feature transform (SIFT) of the face recognition system of FIG. 1.
Figure 3:
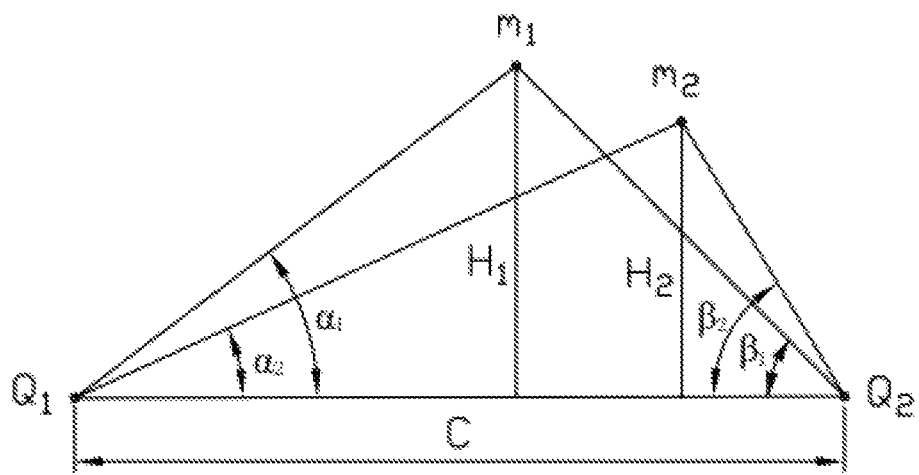
FIG. 3 is a working principle diagram of one embodiment of the face recognition system of FIG. 1.

Referring to FIGS. 2-3, the camera module 10 includes a single lens imaging element for image capture. A first image can be obtained by the single lens imaging element at a first position $Q_1$, and then a second image can be obtained by the single lens imaging element at a second position $Q_2$. The displacement C between the first position $Q_1$ and the second position $Q_2$, and the azimuth $\alpha_1$, $\alpha_2$, $\beta_1$, $\beta_2$ can be obtained by the displacement output module 30. The same facial feature points m, m' can be find from the first image and the second image through the scale invariant feature transform by the feature point recognition module 20. The facial feature point m on the first image and the feature point m' on the second image correspond to the same feature point M of the target object. The displacement C between the first position $Q_1$ and the second position $Q_2$, and the azimuth $\alpha_1$, $\alpha_2$, $\beta_1$, $\beta_2$ are send to the distance calculation module 40. The vertical distance $H_1$ between the feature point $m_1$ and the displacement C is calculated by the distance calculation module 40 and used as the deep distance $H_1$ of the feature point $m_1$. The vertical distance $H_2$ between the feature point $m_2$ and the displacement C is calculated by the distance calculation module 40 and used as the deep distance $H_1$ of the feature point $m_2$. More deep distances such as $H_3$, $H_4$, $H_5$ ... of the feature point $m_3$, $m_4$, $m_5$ ... can be obtained by the distance calculation module 40. The difference between two of the deep distances $H_1$, $H_2$, $H_3$, $H_4$, $H_5$ ... are obtained by the face recognition module 50. If the difference is zero, the target object is judged as a planner image and not target user. If the difference is not zero, further judging step need to be performed.

The feature points $m_1$, $m_2$, $m_3$, $m_4$, $m_5$ ... can be the organs such as nose, eyes, mouth, or ears. When the first image and the second image are obtained at two unknown positions $Q_1$ and $Q_2$, the displacement C between the two positions $Q_1$ and $Q_2$ can be detected by a displacement sensor, and the azimuth $\alpha_1$, $\alpha_2$, $\beta_1$, $\beta_2$ of the two positions $Q_1$ and $Q_2$ can be detected by a gyroscope. When the face recognition system 1 does not comprises displacement sensor and gyroscope, the two positions $Q_1$ and $Q_2$ can be set as fixed value. When one of the two positions $Q_1$ and $Q_2$ are defined, the displacement output module 30 can output the displacement C and the azimuth $\alpha_1$, $\alpha_2$, $\beta_1$, $\beta_2$ to the distance calculation module 40. Also, the displacement output module 30 can include a positioning module configured to send an instructions to control the camera module 10 to capture the first image and the second image at designated positions. For example of mobile phone, the first image and the second image can be captured by the camera lens, the displacement C between the two positions $Q_1$ and $Q_2$ can be obtained by the GPS, and the azimuth $\alpha_1$, $\alpha_2$, $\beta_1$, $\beta_2$ of the two positions $Q_1$ and $Q_2$ cane be obtained by the gyroscope.

Figure 4:
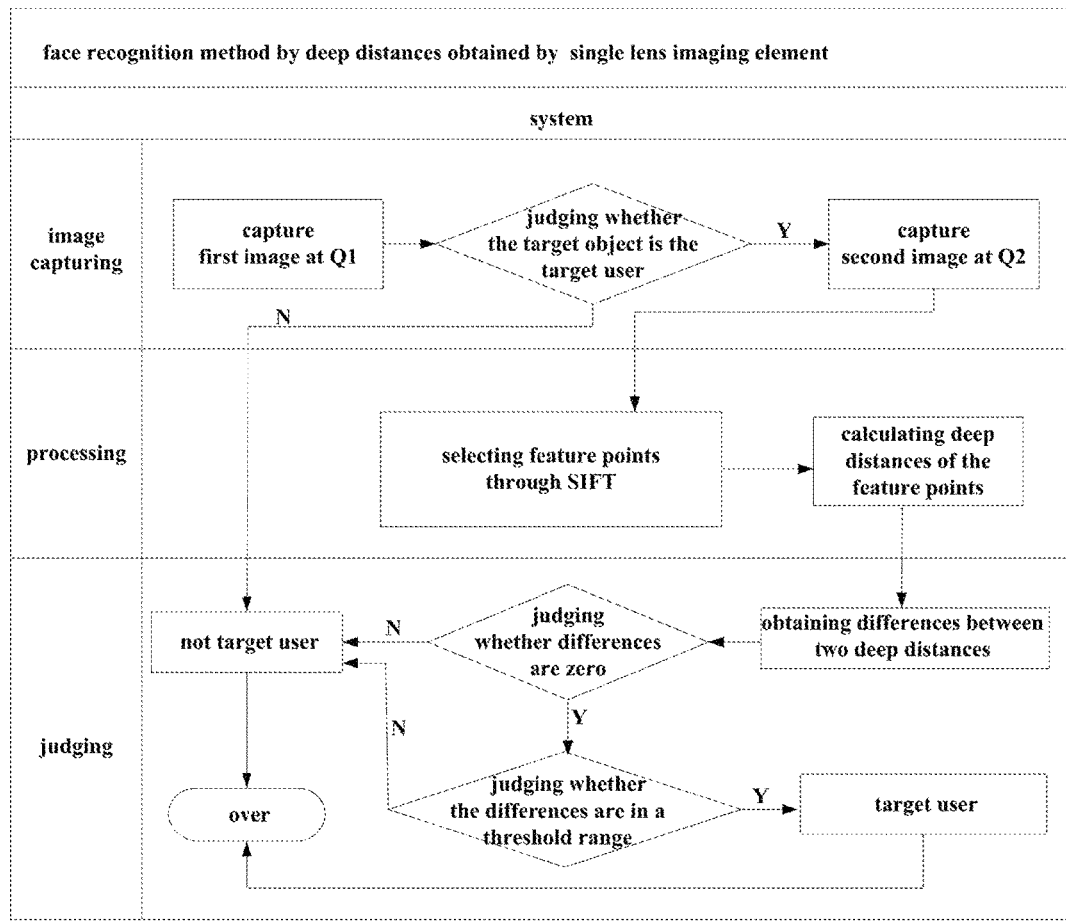
FIG. 4 is a flow chart of one embodiment of a face recognition method.

Referring to FIG. 4, the face recognition method of the face recognition system 1 of one embodiment comprises following steps:

step (S11), the first image of the target object is obtained by the camera module 10 at a first position $Q_1$ and used to judge whether the target object is the target user by comparing with the face recognition information of the database; if yes, the camera module 10 is used to capture a second image a second position $Q_2$, if no, the target object is judged as not target user;

step (S12), the same facial feature points m, m' are find from the first image and the second image through the scale invariant feature transform by the feature point recognition module 20, and the feature points $m_1$, $m_2$, ... $m_N$ are selected and sent to the distance calculation module 40, wherein N is the number of the feature points and N≥2;

step (S13), the displacement C between the two positions $Q_1$ and $Q_2$, and the azimuth $\alpha_1$, $\alpha_2$, $\beta_1$, $\beta_2$ of the two positions $Q_1$ and $Q_2$ are obtained by the displacement output module 30 and sent to the distance calculation module 40;

step (S14), the deep distances $H_1$, $H_2$, ... $H_N$ of the feature points $m_1$, $m_2$, ... $m_N$ are calculated by the distance calculation module 40, wherein the deep distance is the vertical distance between the feature point and the displacement C;

step (S15), the differences between two of the deep distances $H_1$, $H_2$, ... $H_N$ are obtained by the face recognition module 50; if the differences are zero, the target object is judged as a planner image and not target user; if the differences are not zero, go to step (S16);

step (S16), judging whether the differences are in a threshold range; if yes, the target object is judged as the target user; if no, target object is judged as not target user.

In step (S11), the single lens imaging element of the camera module 10 is used to capture the first image, and then the first image is obtained by the camera module 10 and send to the database. The face recognition information stored in the database comprises the image data of the user. The judge whether the target object is the target user is performed by comparing the image data of the first image with the image data of the user. The first image is not identified as a planner image or a true face of the user.

In step (S12), the feature points $m_1$, $m_2$, ... $m_N$ can be selected by the feature point recognition module 20. In one embodiment, N=6.

In step (S13), the displacement C between the two positions $Q_1$ and $Q_2$ can be detected by a displacement sensor, and the azimuth $\alpha_1$, $\alpha_2$, $\beta_1$, $\beta_2$ of the two positions $Q_1$ and $Q_2$ can be detected by a gyroscope. When the face recognition system 1 does not comprises displacement sensor and gyroscope, the two positions $Q_1$ and $Q_2$ can be set as fixed value by the displacement output module 30.

In step (S15), the differences between each two of the deep distances $H_1$, $H_2$, ... $H_N$ are obtained by the face recognition module 50. The number M of the differences can be calculated by formula: $M=N!/2!(N-2)!$. In one embodiment, N=6, and M=15.

In step (S16), the judging whether the differences are in a threshold range comprises: comparing the differences with the threshold range and obtain the number $M_1$ of the differences that the differences are in the threshold range; and judging whether M1/M≥Y, wherein Y is a constant; if yes, the target object is judged as the target user; if no, target object is judged as not the target user. In one embodiment, the threshold range is equal or greater than 1 millimeter and equal or less than 3 centimeters, and Y=80%.

The face recognition system and face recognition method are simple and low cost. The face recognition system and face recognition method can be applied in both multi lens or RGBD system and small electric device such as mobile phone.

The embodiments shown and described above are only examples. Even though numerous characteristics and advantages of the present technology have been set forth in the forego description, together with details of the structure and function of the present disclosure, the disclosure is illustrative only, and changes may be made in the detail, including in matters of shape, size and arrangement of the parts within the principles of the present disclosure up to, and including, the full extent established by the broad general meaning of the terms used in the claims.

Depending on the embodiment, certain of the steps of methods described may be removed, others may be added, and the sequence of steps may be altered. The description and the claims drawn to a method may include some indication in reference to certain steps. However, the indication used is only to be viewed for identification purposes and not as a suggestion as to an order for the steps.

What is claimed is:
1. A face recognition system comprising:
a camera module, wherein the camera module comprises a single lens imaging element for image capture and a database stored with an user image data of a target user; and the camera module is configured to capture a first image of a target object by the single lens imaging element at a first position $Q_1$ and judge whether the target object is the target user by comparing a first image data of the first image with the user image data of the target user; when the target object is judged as the target user, the single lens imaging element is used to capture a second image at a second position $Q_2$;

a feature point recognition module configured to detect the first image and the second image and obtain a plurality of feature points $m_1, m_2, \ldots m_N$ by finding same facial feature points from the first image and the second image through a scale invariant feature transform, wherein N is the number of the plurality of feature points, and $N \geq 2$;

a displacement output module configured to obtain a displacement C between the first position $Q_1$ and the second position $Q_2$ and output azimuth $\alpha_1, \alpha_2, \beta_1, \beta_2$ of the first position $Q_1$ and the second position $Q_2$;

a distance calculation module configured to calculate a plurality of deep distances $H_1, H_2, \ldots H_N$ of the plurality of feature points $m_1, m_2, \ldots m_N$, wherein each of the plurality of deep distances is a vertical distance between one of the plurality of feature points and the displacement C; and a face recognition module configured to judge whether the target object is the target user by obtaining a plurality of differences between two of the plurality of deep distances $H_1, H_2, \ldots H_N$; when the plurality of differences are zero, the target object is judged as a planner image and not the target user; when the plurality of differences are not zero, judging whether the plurality of differences are in a threshold range; when the plurality of differences are judged as in the threshold range, the target object is judged as the target user; when the plurality of differences are judged as not in the threshold range, the target object is judged as not the target user.

2. The face recognition system of claim 1, wherein the displacement output module comprises a displacement sensor and a gyroscope.

3. The face recognition system of claim 1, wherein the displacement output module comprises a positioning module configured to send an instructions to control the camera module to capture the first image at the first position $Q_1$ and the second image at the second position $Q_2$.

4. A face recognition method, the method comprising the following steps:

step (S11), a first image of a target object is obtained by a camera module at a first position $Q_1$ and used to judge whether the target object is a target user by comparing a first image data of the first image with an user image data of a target user stored in a database; when the target object is judged as the target user, the camera module is used to capture a second image at a second position $Q_2$; wherein the camera module comprises a single lens imaging element for image capture;

step (S12), same facial feature points m, m' are found from the first image and the second image through a scale invariant feature transform by a feature point recognition module, and a plurality of feature points $m_1, m_2, \ldots m_N$ are selected and sent to a distance calculation module by the feature point recognition module, wherein N is the number of the plurality of feature points, and $N \geq 2$;

step (S13), a displacement C between the first position $Q_1$ and the second position $Q_2$, and azimuth $\alpha_1, \alpha_2, \beta_1, \beta_2$ of the first position $Q_1$ and the second position $Q_2$ are obtained by a displacement output module and sent to the distance calculation module;

step (S14), a plurality of deep distances $H_1, H_2, \ldots H_N$ of the feature points $m_1, m_2, \ldots m_N$ are calculated by the distance calculation module, wherein each of the plurality of deep distances is a vertical distance between one of the plurality of feature points and the displacement C;

step (S15), a plurality of differences between two of the plurality of deep distances $H_1, H_2, \ldots H_N$ are obtained by a face recognition module; when the plurality of differences are zero, the target object is judged as a planner image and not the target user; when the plurality of differences are not zero, go to step (S16); and step (S16), judging whether the plurality of differences are in a threshold range; when the plurality of differences are judged as in the threshold range, the target object is judged as the target user; when the plurality of differences are judged as not in the threshold range, target object is judged as not the target user.

5. The method of claim 4 wherein the displacement C between the first position $Q_1$ and the second position $Q_2$ is detected by a displacement sensor of the displacement output module.

6. The method of claim 4 wherein the azimuth $\alpha_1, \alpha_2, \beta_1, \beta_2$ of the first position $Q_1$ and the second position $Q_2$ are detected by a gyroscope of the displacement output module.

7. The method of claim 4, wherein the displacement output module send an instructions to control the camera module to capture the first image at the first position $Q_1$ and the second image at the second position $Q_2$.

8. The method of claim 4, wherein the judging whether the plurality of differences are in the threshold range comprises:

comparing the plurality of differences with the threshold range and obtain a number $M_1$ of the plurality of differences that are in the threshold range; and judging whether $M1/M \geq Y$, wherein Y is a constant, and $M=N!/2!(N-2)!$; when $M1/M \geq Y$ is met, the plurality of differences are judged as in the threshold range; when $M1/M \geq Y$ is not met, the plurality of differences are judged as not in the threshold range.

9. The system of claim 1, wherein the judging whether the plurality of differences are in the threshold range comprises:

comparing the plurality of differences with the threshold range and obtain a number $M_1$ of the plurality of differences that are in the threshold range; and judging whether $M1/M \geq Y$, wherein Y is a constant, and $M=N!/2!(N-2)!$; when $M1/M \geq Y$ is met, the plurality of differences are judged as in the threshold range; when $M1/M \geq Y$ is not met, the plurality of differences are judged as not in the threshold range.

* * * * *